United States Patent [19]

Anderson

[11] 3,980,696
[45] Sept. 14, 1976

[54] PHOTODOSIMETER FILM BADGE
[75] Inventor: Robert J. Anderson, Villa Park, Calif.
[73] Assignee: Beckman Instruments, Inc., Fullerton, Calif.
[22] Filed: July 25, 1974
[21] Appl. No.: 491,875

[52] U.S. Cl. ............................ 428/483; 428/34; 428/38; 428/412; 428/516; 428/520; 428/532; 252/408; 23/230 B; 23/253 TP; 156/256
[51] Int. Cl.² .................. B32B 27/06; B32B 27/36
[58] Field of Search .............. 161/1, 182, 183, 231, 161/247, 265; 252/408; 23/230 B, 253 TP; 428/34, 38, 483, 412, 516, 520, 532; 156/256

[56] References Cited
UNITED STATES PATENTS

| 2,854,317 | 9/1958 | Free et al. ................... 252/408 X |
| 3,092,465 | 1/1963 | Adams et al. ................. 23/253 TP |
| 3,420,635 | 1/1969 | Davis ........................... 23/253 TP |
| 3,502,437 | 3/1970 | Mass ............................ 23/253 TP |
| 3,552,929 | 1/1971 | Field et al. .................... 23/253 TP |
| 3,853,476 | 12/1974 | Rittersdof ..................... 252/408 X |

Primary Examiner—Harold Ansher
Assistant Examiner—Patricia C. Ives
Attorney, Agent, or Firm—R. J. Steinmeyer; R. R. Meads

[57] ABSTRACT

A film badge sensitive to non-ionizing radiation and a method of making same. The film badge consists of dissolved bilirubin bound in a polymeric film base and sealed within an optically transparent substrate. The film badge is useful during phototherapy for the treatment of hyperbilirubinemia in the newborn and is capable of measuring the total irradiance effective in decomposing bilirubin.

10 Claims, 3 Drawing Figures

PHOTODOSIMETER FILM BADGE

BACKGROUND OF THE INVENTION

1. Field of the Invention

The present invention relates to a photodosimeter film badge and, more particularly, to a film badge and a method of making same for use in measuring irradiance during phototherapy for the treatment of hyperbilirubinemia.

2. Description of the Prior Art

Bilirubin is a molecule that is normally found in the blood. It is formed from the hemoglobin of red cells in the course of their normal breadknow and is transported in the plasma to the liver where it is conjugated with glucuronic acid to form bilirubin diglucuronide and excreted by way of the bile into the intestines. However, when the liver is not fully functional in this respect, as often occurs in the first few days of an infant's life, especially in premature infants, the bilirubin level can rise in the blood serum and lead to jaundice, which is distinguished by a visually detectable yellow coloration of the skin. The medical term for this condition, too much bilirubin in the blood, is hyperbilirubinemia.

If allowed to persist at high levels in the blood, the bilirubin can cross the blood-brain barrier and stain the brain cells with resulting permanent neurological damage. The condition is known as kernicterus and results in various degrees of motor and mental retardation.

Fortunately, bilirubin can be bleached by light and the photoproducts of bilirubin are excretable. Furthermore, the bilirubin reaction to light is apparently neither photoreversible nor chemically reversible in the dark. In addition, the photoproducts of bilirubin are apparently incapable of crossing the blood-brain barrier, being water soluble, and are also apparently nontoxic.

The discovery of the bilirubin photoeffect has resulted in the use of phototherapy for the treatment of hyperbilirubinemia becoming a generally accepted therapeutic practice. Many carefully controlled studies have been published and all have found that phototherapy is effective in lowering serum bilirubin levels. One can achieve 30 to 50% lower average serum bilirubin concentrations in light treated infants as compared to other methods of control.

In spite of the demonstrated effectiveness of phototherapy in decreasing serum bilirubin concentrations in neonatal infants and the associated prevention of death or injury to the central nervous system, a concern has recently developed due to the lack of knowledge of the safety and efficacy of the use of light energy in the treatment of human disease. For example, there is no direct evidence available that answers the question whether light-induced reductions in serum bilirubin concentration during neonatal life will decrease the risk of later neurologic and psychologic defects that are believed to be the sequelae of hyperbilirubinemia. There is presently a large deficit in knowledge of the nature of the photodegradation products of bilirubin, possible photosensitizing and photoallergic reactions involving endogenous biologic substances or prenatally or neonatally administered drugs, potential genetic and carcinogenic hazards of phototherapy in human infants, long term untold psychologic, endocrine or cellular changes that may result from phototherapy, the most effective wavelength for phototherapy, and the most effective intensities and exposure times.

These concerns have lead to a demonstrated need for a measurement technique capable of responding to the total exposure of the newborn baby to light within the spectral region effective in the photodecomposition of bilirubin. With such a measurement technique, meaningful data can be accumulated.

Some of the fluorescent lamps used in phototherapy units emit electromagnetic radiation in ranges that extend beyond the limits of the visible spectrum. Others emit radiation in more restrictive ranges. Yet, it is common practice for exposures during phototherapy to be measured with light meters. However, light meters are inappropriate for this purpose because they are designed to measure illuminance, that is, the density of electromagnetic radiation spectrally weighted to the response of the human eye. Accordingly, they function with maximum sensitivity between 500 and 600 nanometers (nm) and only with diminishing sensitivity down to 400 nm. Unfortunately, this spectrum does not coincide with the action spectrum for the phototherapy of hyperbilirubinemia. Available data on the action spectrum for photodegradation of serum bilirubin shows that light having a wavelength of 425–500 nm is most effective for bleaching serum bilirubin. Therefore, standard light meters are inadequate for present purposes.

Only a spectroradiometer can provide the desired radiometric information, namely spectral irradiance, which is the radiative power density of the incident light, expressed in watts/square centimeter/unit wavelength, over the entire spectral range incident on the patient. Unfortunately, spectroradiometers are complex, expensive, and probably unsuited for use in a nursery.

A practical instrument for monotoring phototherapy in a hospital environment must be capable of meeting certain tests. First of all, the instrument and essential accessories should be inexpensive enough to ensure their use in conjunction with phototherapy that is conducted under any and all circumstances. Operation of the equipment should be simple enough for nursery personnel to become skilled in its use after a short instruction period. The equipment should be susceptible to routine, simple calibration within the hospital nursery. The sensing element must be small enough so that it will not interfere with the care of the infant and must be constructed so that it will not be damaged by sterilization.

From a technical standpoint, certain additional criteria are also essential. The action spectrum for the sensing element must match the action spectrum for the photodestruction of serum bilirubin in a neonatal infant, i.e. the sensing element must respond in exactly the same region of the spectrum as that which is effective in the photodecomposition of bilirubin. Furthermore, the kinetics of the change in the sensing element must match the kinetics of the change in bilirubin levels during photodecomposition. The sensing element must be responsive to the phototherapy irradiance over periods of phototherapy extending from a few hours to approximately 96 hours (4 days). Finally, any measurement technique should require a minimum of handling or processing to make a measurement. Preferably, the equipment should be directly processed and not such that chemical processing is required. Only in this way will the equipment permit continued monitoring of total exposure without requiring constant recalibration or restarting of the process.

Many commercial radiometers are available at prices ranging from several hundred to several thousand dollars. They have a wide variety of sensors, spectral ranges, calibration capabilities, etc. However, as presently offered by existing manufacturers, none meets all the criteria listed above.

SUMMARY OF THE INVENTION

According to the present invention, there is provided a photodosimeter film badge and a method of making same which meets all of the criteria discussed above, and others. The basic principle of the present invention is the use of a photodosimeter film badge attached to the baby and exposed to the same phototherapy environment as the baby, in much the same manner as nuclear radiation dosimeter badges now function. The total exposure of the present film badge to the irradiance effective in the photodecomposition of bilirubin is then measured by an instrument capable of measuring the density of the film in some spectral region in which the film has changed density as a result of the exposure to the phototherapy irradiance.

The present film badge responds in the same region of the spectrum as that which is effective in the photodecomposition of bilirubin. Furthermore, the kinetics of the change in the film badge may be adjusted to match the kinetics involved in the photodecomposition of bilirubin in the body. The present film undergoes an optical density change as a result of irradiation by the phototherapy lamps and such density change is directly proportional to the time integral of the irradiance. The optical density change occurs very slowly so that the film is responsive to phototherapy irradiance over periods of phototherapy extending from a few hours to as many as 96 hours.

Of great significance, a minimum of handling is required to make measurements using the present film badge. That is, since the optical density of the film changes as a function of the irradiance, the optical density may be measured directly without any chemical processing of the film. Thus, exposure may be monitored continuously.

The present technique is inexpensive enough to insure use in conjunction with phototherapy that is conducted under any and all circumstances. Use of the present film badge is simple enough for nursery personnel to become skilled in its use after a short instruction period. The instruments which may be used to measure the optical density of the film badge are relatively simple and susceptible to routine, simple calibration within a hospital nursery. It will also be obvious that the film badge can be made quite small to that it will not interfere with the care of the infant in the nursery. Furthermore, the present film badge will not be damaged by sterilization.

Briefly, the present dosimeter is sensitive to non-ionizing radiation in the frequency spectrum covering 425–500 nm. The dosimeter consists of dissolved bilirubin bound in a polymeric film base having a uniform thickness and sealed within an optically transparent substrate. Exposure to radiation results in a proportional change in the optical density of the badge which may be measured by a simple filter photometer. The change in density is proportional to the dosage received during phototherapy in watt-seconds/cm$^2$.

The dosimeter film badge is made by dissolving bilirubin in an organic solvent, such as chloroform, to form a first solution; dissolving a polymer, such as polystyrene or polycarbonate, in the same organic solvent to form a second solution; combining the first and second solutions; depositing a thin layer of the combined solution on an optically flat surface; permitting the organic solvent to slowly evaporate in an oxygen-excluded atmosphere to form a thin film of dissolved bilirubin bound in a polymeric film base; cutting the polymeric film base into a desired shape; and sealing the film base within an optically transparent substrate.

OBJECTS

It is therefore an object of the present invention to provide a photodosimeter film badge.

It is a further object of the present invention to provide a method of making a photodosimeter film badge.

It is a still further object of the present invention to provide a photodosimeter film badge having an action spectrum which matches the action spectrum for the photodestruction of serum bilirubin in neonatal infants.

It is another object of the present invention to provide a photodosimeter film badge which exhibits an optical density change in the visible spectrum that is proportional to the time integral of irradiance.

It is still another object of the present invention to provide a photodosimeter film badge whose kinetics of change match the kinetics of the body change during phototherapy for the treatment of hyperbilirubinemia.

Another object of the present invention is the provision of a photodosimeter film badge which requires no processing and which may be directly read to determine its change in optical density.

Still another object of the present invention is the provision of a photodosimeter film badge which is responsive to phototherapy irradiance over extended periods of time.

Still another object of the present invention is the provision of a photodosimeter film badge which is inexpensive enough to ensure use in conjunction with phototherapy that is conducted under all circumstances.

Still another object of the present invention is the provision of a photodosimeter film badge which is small enough that it will not interfere with the care of an infant and which is constructed so that it will not be damaged by sterilization.

Still other objects, features, and attendant advantages of the present invention will become apparent to those skilled in the art from a reading of the following detailed description of the preferred embodiment constructed in accordance therewith, taken in conjunction with the accompanying drawings wherein:

DESCRIPTION OF THE PREFERRED EMBODIMENTS

Since it is desired to measure the total irradiance effective in decomposing serum bilirubin, one is lead to consider bilirubin itself as a material for performing the measurement. It is known that bilirubin in organic solvents, such as chloroform, absorbs oxygen and is converted to biliverdin. In its native state, free bilirubin exhibits an absorption maximum in the vicinity of 460 nm and is therefore colored a rather intense red. Biliverdin, on the other hand, is colored green. Therefore, it is conveivable that the conversion of bilirubin to biliverdin, upon irradiating with light, can be measured for present purposes. However, as a practical matter, this has not been possible, for several reasons.

The primary problem is that the conversion of bilirubin to biliverdin in the presence of an oxygen atmosphere occurs very rapidly, within a few minutes. Thus, one of the main criteria, namely that the sensing element be responsive to the phototherapy irradiance over periods extending for many hours, is not met. While there are techniques available for slowing down the reaction, it simply cannot be slowed down enough. Furthermore, under certain conditions, biliverdin loses the absorbed oxygen and returns to bilirubin, which obviously effects the measurement. Finally, the absorption spectra of bilirubin and biliverdin overlap, making it difficult to measure the spectrum of one or the other.

Figure 1:
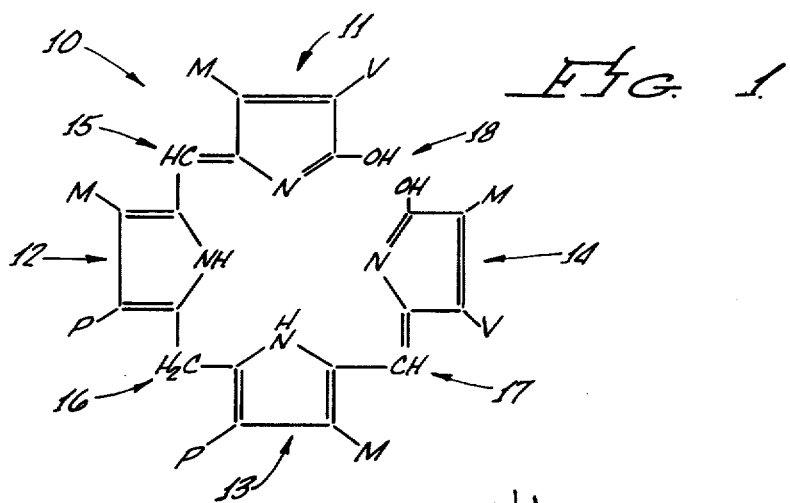
FIG. 1 is a diagram of the chemical structure of a bilirubin molecule.

Therefore, according to the present invention, a film badge is constructed in a manner which prevents the conversion of bilirubin to biliverdin. The present film badge is designed to operate on other physical characteristics of bilirubin. More specifically, and with reference to FIG. 1, the bilirubin molecule, generally designated 10, is a tetrapyrrole ring, the four pyrroles 11–14 being joined at three corners 15–17, the fourth corner 18 being unconnected. Furthermore, there is a weak bond at corner 16, between the dipyrroles made up of pyrroles 11 and 12 and pyrroles 13 and 14, which permits a cleavage of the ring into two dipyrroles upon the absorption of a photon. The photon energy apparently excites the molecule, causing the cleavage into the two dipyrroles. As mentioned previously, free bilirubin exhibits an absorption maximum at 460 nm and has a rather intense red color, resulting in a very low transparency. On the other hand, when the tetrapyrrole ring is broken into two dipyrroles, the dipyrroles are essentially optically transparent. Accordingly, as bilirubin is exposed to light, assuming that oxygen has been eliminated to prevent the conversion to biliverdin, there is a steady decrease in the optical density at 460 nm due to the conversion of the bilirubin tetrapyrrole ring into two dipyrroles. The absorption maximum at 460 nm is decreased by an amount that is proportional to the total exposure — that is, the time integral of irradiance. Thus, as the bilirubin is exposed to more and more light in the spectral region effective in the photodecomposition of bilirubin, the density of the absorption maximum at 460 nm decreases and, in addition, shifts slightly toward the shorter wavelengths so that at relatively low absorbances, the absorption maximum occurs at approximately 450 nm. This decrease in optical density may therefore be directly measured with a simple photometer.

On the other hand, experimentation has shown that bilirubin photodecomposes at variable rates, to quite different decomposition products, depending upon the base into which it is incorporated during the light exposure. Thus, it is significant how the bilirubin is formed into a film badge.

According to the present invention, free bilirubin, which is normally a crystalline material, is first dissolved in an organic solvent in which it is soluble. It is further necessary that such solvent not introduce oxygen, to prevent the conversion of bilirubin to biliverdin, and the solvent must only dissolve the IX-alpha isomer of bilirubin since it is the only isomer found in babies and is the only isomer that exhibits the desired behavior. The best and most complete solubility of free bilirubin, when dissolving at ambient temperature, is in chloroform. Other good neutral solvents, in decreasing order of desirability, are carbon disulfide, benzene, chlorobenzene, benzotrichloride, methylene chloride (dichloromethane), and toluene.

If an acidic solvent is desired, any of the above solvents may be used with the addition of 5 to 10% of phenol or acetic acid. Acidic solvents exhibit a very high solubility but there is a rapid conversion of bilirubin in the presence of light and the potential for conversion to biliverdin.

If a basic solvent is desired, suitable solvents are pyridine, N-methyl pyrrolidine, acetiphenol, and benzophenone. However, basic solvents, when present in small quantities in the finished badge, cause rapid conversion of bilirubin, especially to biliverdin.

When concentrated solutions of bilirubin are desired, to obtain a sufficient starting density to see a large change therein, on the order of 5 to 6 milligrams per milliliter of solvent, the only suitable solvent found has been chloroform.

In addition to the organic solvent, trace chemicals should be included to absorb oxygen, to prevent the conversion of bilirubin to biliverdin. A wide variety of oxygen absorbing chemicals are known to those skilled in the art, such as alkylated phenols, organic phosphites, and the like.

After the bilirubin has been dissolved in the organic solvent and the trace chemicals added, to form a first solution, a polymer is then dissolved in the same organic solvent to form a second solution. The polymer selected is chosen for its effect on the kinetics of the completed film badge. Suitable polymers, in decreasing order of desirability, are a copolymer sold commercially under the trade name "XT-Polymer" (it is a copolymer of acrylic with melamine), polycarbonate or phenoxy or their epoxy equivalents, polystyrene - crystal grade, a copolymer sold commercially under the trade name "NAS Polymer" (it is a copolymer of styrene and methylmethacrylate), a copolymer sold commercially under the trade name "Elvax 40" (it is an ethylenevinyl acetate copolymer), polymethyl methacrylate, and copolymers of methylmethacrylate and high methacrylates and acrylates, such as methylmethacrylate and butylmethoerfate.

Figure 2:
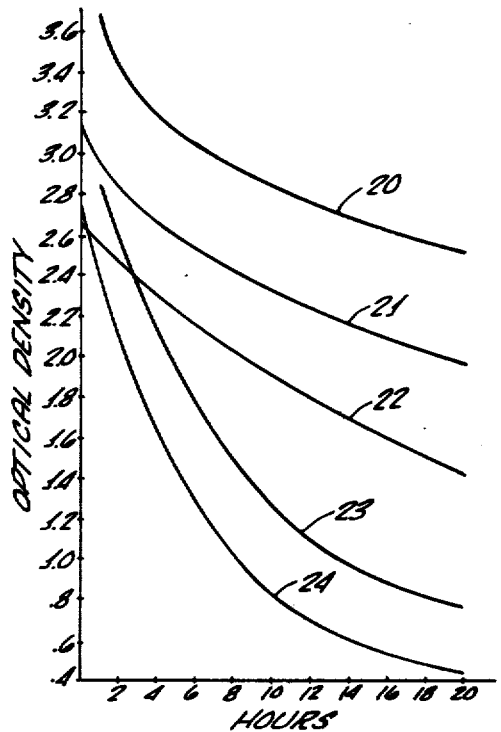
FIG. 2 is a series of curves showing the effect of the polymer used in the film badge on the rate of bilirubin conversion.

FIG. 2 shows a series of curves of optical density vs. time for different completed film badges to show how the polymer used effects the kinetics of the rate of bilirubin conversion. All of the curves were derived with the same standard light bank and measurements of optical density were made once each hour. Curves 20–24 were made with completed film badges consisting of bilirubin bound in a film base of XT-Polymer, polycarbonate, phenoxy, polystyrene and NAS-Polymer, respectively. It is obvious that curves 20–22 have the most desirable shapes in that the starting densities are the highest and the rates of change are the lowest.

The first solution of bilirubin and solvent and the second solution of polymer and solvent, both with suitable trace chemicals, are then combined to form a single solution. The combined solution is then formed into a thin film and the organic solvent is permitted to slowly evaporate in an oxygen excluded atmosphere to form a thin film of dissolved bilirubin bound in a polymeric film base.

More specifically, after the first and second solutions are combined, a thin layer of the combined solution is deposited on an optically flat glass surface. A uniform thickness is necessary since it results in a uniform density and a highly accurate measurement. The organic solvent is permitted to slowly evaporate, such as in a dry nitrogen atmosphere, until the film is sufficiently hardened to remove it from the glass surface. The film is then hung in a dry nitrogen atmosphere where it continues to dry to slowly evaporate the solvent. The drying process must be very slow to ensure that the bilirubin remains dissolved in the polymer and to prevent curling of the film. Again, the atmosphere must exclude oxygen to prevent conversion of the bilirubin to biliverdin.

After the film of dissolved bilirubin bound in the polymeric base is completely dry, the film base is cut into a desired shape, such as into a circle having a diameter of 1 inch or less. Then, to ensure the continued exclusion of oxygen, the film base is bonded to an optically transparent substrate, such as by sealing the film base between two pieces of mylar, polyester sold under the trade name "Cronar" or cellulose acetate.

Figure 3:
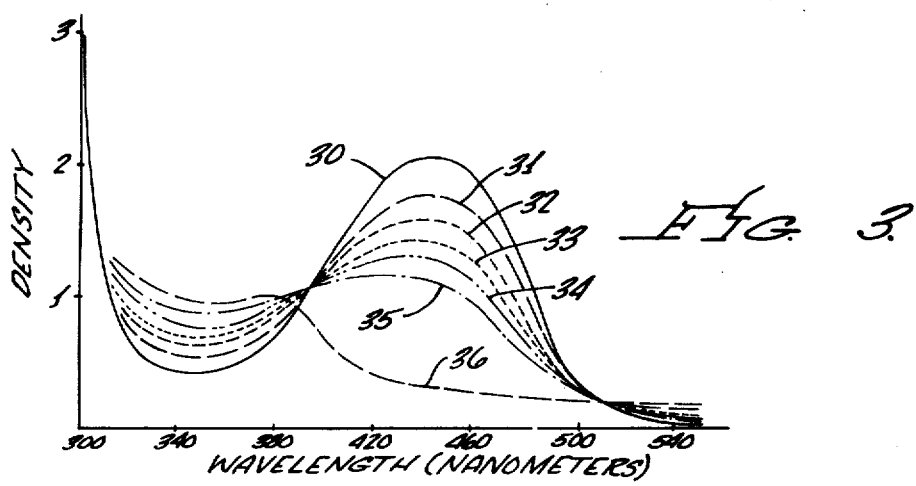
FIG. 3 is a series of curves showing the change in optical density upon exposure to light of a film badge constructed in accordance with the present invention.

FIG. 3 shows a typical spectrum of optical density vs. wavelength for a film badge of bilirubin in a polycarbonate film base constructed as described above. The different curves are taken after various periods of exposure to a flourescent lamp with an irradiance in the spectral region from 420–500 nm of approximately 10 microwatts/cm$^2$. Curve 30 shows the original optical density vs. wavelength relationship whereas curves 31–36 show the change in this relationship after periods of exposure of 1 hour, 2 hours, 3 hours, 5 hours, 6 hours, 7 hours, and 24 hours, respectively.

In conclusion, it has been found that bilirubin may be incorporated in a polymeric film base and deposited on a transparent film substrate to form a photodosimeter film badge for use in phototherapy. The film badge is responsive in the proper spectral region, responds over a period of time commencerate with that used to perform phototherapy, is non-toxic and chemically stable, and is capable of being sterilized in a gaseous sterilization apparatus. Thus, a film badge dosimeter using this film is appropriate for use in the nursery and fulfills the criteria set forth hereinabove for a phototherapy monitoring instrument.

While the invention has been described with respect to the preferred embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:
1. A dosimeter for use in the treatment of hyperbilirubinemia by phototherapy comprising:
   a. a thin film of uniform thickness comprising dissolved bilirubin bound in a polymeric base, said bilirubin being substantially only the IX-alpha isomer thereof in sufficient concentration to cause a detectable change in the optical density of said film upon exposure to light having a wavelength of about 425–500 nanometers; and,
   b. an optically transparent substrate impervious to the passage of oxygen and sealing said film whereby oxygen is excluded from contacting said film while light striking said film will cause photodecomposition of the bilirubin without transforming the bilirubin into biliverdin.
2. The dosimeter of claim 1 wherein said substrate comprises two pieces of optically transparent material sealing said film therebetween.
3. A dosimeter according to claim 1 having an action spectrum which is the same as the action spectrum for the photodecomposition of serum bilirubin in the human body.
4. A dosimeter according to claim 3 wherein the kinetics of the change in optical density of said film badge is similar to the kinetics of the photodecomposition of serum bilirubin in the human body.
5. A dosimeter according to claim 1 wherein said polymeric film base is a copolymer of acrylic with melamine.
6. A dosimeter according to claim 1 wherein said polymeric base is polycarbonate or phenoxy.
7. A dosimeter according to claim 1 wherein said polymeric base is polystyrene.
8. A dosimeter according to claim 1 wherein said polymeric base is a copolymer of styrene and methylmethacrylate.
9. A dosimeter according to claim 1 wherein said polymeric base is ethylene-vinyl acetate copolymer.
10. A dosimeter according to claim 1 wherein said polymeric base is polymethyl methacrylate.

* * * * *